United States Patent
Nunally et al.

(10) Patent No.: US 6,895,034 B2
(45) Date of Patent: May 17, 2005

(54) ULTRA-WIDEBAND PULSE GENERATION SYSTEM AND METHOD

(75) Inventors: Patrick O'Neal Nunally, San Diego, CA (US); John Santhoff, San Diego, CA (US)

(73) Assignee: Pulse-LINK, Inc., Carlsbad, CA (US)

( * ) Notice: Subject to any disclaimer, the term of this patent is extended or adjusted under 35 U.S.C. 154(b) by 14 days.

(21) Appl. No.: 10/188,987

(22) Filed: Jul. 2, 2002

(65) Prior Publication Data
US 2004/0005013 A1 Jan. 8, 2004

(51) Int. Cl.⁷ .................................................. H04B 1/69
(52) U.S. Cl. ...................................... 375/130; 375/257
(58) Field of Search ................................ 375/257, 295, 375/353, 256, 130; 342/21, 27, 82, 175

(56) References Cited

U.S. PATENT DOCUMENTS

| | | |
|---|---|---|
| 3,728,632 A | 4/1973 | Ross |
| 4,427,982 A | 1/1984 | Caprio |
| 4,641,317 A | 2/1987 | Fullerton |
| 4,743,906 A | 5/1988 | Fullerton |
| 4,813,057 A | 3/1989 | Fullerton |
| 4,815,106 A | 3/1989 | Propp |
| 4,864,589 A | 9/1989 | Endo |
| 4,979,186 A | 12/1990 | Fullerton |
| 5,051,720 A | 9/1991 | Kittirutsunetorn |
| 5,146,616 A | 9/1992 | Tang et al. |
| 5,363,108 A | 11/1994 | Fullerton |
| 5,491,463 A | 2/1996 | Sargeant |
| 5,519,400 A | 5/1996 | McEwan |
| 5,554,968 A | 9/1996 | Lee |
| 5,583,892 A * | 12/1996 | Drakul et al. ............... 375/353 |
| 5,677,927 A | 10/1997 | Fullerton |
| 5,687,169 A | 11/1997 | Fullerton |
| 5,729,607 A | 3/1998 | DeFries et al. |
| 5,744,526 A | 4/1998 | Goossens et al. |
| 5,745,837 A | 4/1998 | Fuhrmann |
| 5,864,284 A | 1/1999 | Sanderson |
| 5,937,342 A | 8/1999 | Kline |
| 5,940,387 A | 8/1999 | Humpleman |
| 5,982,276 A | 11/1999 | Stewart |
| 6,026,125 A | 2/2000 | Larrick, Jr. et al. |
| 6,031,862 A | 2/2000 | Fullerton et al. |
| 6,040,759 A | 3/2000 | Sanderson |
| 6,178,217 B1 | 1/2001 | DeFries et al. |
| 6,281,784 B1 | 8/2001 | Redgate et al. |
| 6,373,377 B1 | 4/2002 | Sacca et al. |
| 6,421,390 B1 * | 7/2002 | Burkhart ...................... 375/257 |
| 6,512,474 B2 * | 1/2003 | Pergande ...................... 342/21 |
| 2001/0048382 A1 * | 12/2001 | Low et al. .................. 341/157 |
| 2002/0076193 A1 | 6/2002 | Melick et al. |

FOREIGN PATENT DOCUMENTS

| | | |
|---|---|---|
| WO | WO 01/39451 A1 | 5/2001 |
| WO | WO 02/31986 A2 | 4/2002 |

\* cited by examiner

*Primary Examiner*—Don N. Vo
(74) *Attorney, Agent, or Firm*—Pulse-LINK, Inc.; Peter R. Martinez; Steven A. Moore (57) ABSTRACT

A system and method to generate an ultra-wideband pulse is provided. One method of the present invention includes generating an ultra-wideband pulse that includes a first section representing a first data symbol, and a second section representing a second data symbol. A second method of the present invention includes generating an ultra-wideband that comprises a plurality of time bins, with each time bin comprising a data symbol that represents a multiplicity of binary digits. Another method of the present invention includes generating an ultra-wideband pulse that comprises a plurality of time bins, with each time bin representing a first data symbol. The same ultra-wideband pulse also includes an amplitude that represents a second data symbol.

32 Claims, 8 Drawing Sheets

ULTRA-WIDEBAND PULSE GENERATION SYSTEM AND METHOD

FIELD OF THE INVENTION

The present invention generally relates to ultra-wideband communications. More particularly, the invention concerns a method to generate ultra-wideband pulses that convey data through a wire medium.

BACKGROUND OF THE INVENTION

The Information Age is upon us. Access to vast quantities of information through a variety of different communication systems are changing the way people work, entertain themselves, and communicate with each other. For example, as a result of increased telecommunications competition mapped out by Congress in the 1996 Telecommunications Reform Act, traditional cable television program providers have evolved into full-service providers of advanced video, voice and data services for homes and businesses. A number of competing cable companies now offer cable systems that deliver all of the just-described services via a single broadband network.

These services have increased the need for bandwidth, which is the amount of data transmitted or received per unit time. More bandwidth has become increasingly important, as the size of data transmissions has continually grown. Applications such as in-home movies-on-demand and video teleconferencing demand high data transmission rates. Another example is interactive video in homes and offices.

Other industries are also placing bandwidth demands on Internet service providers, and other data providers. For example, hospitals transmit images of X-rays and CAT scans to remotely located physicians. Such transmissions require significant bandwidth to transmit the large data files in a reasonable amount of time. These large data files, as well as the large data files that provide real-time home video are simply too large to be feasibly transmitted without an increase in system bandwidth. The need for more bandwidth is evidenced by user complaints of slow Internet access and dropped data links that are symptomatic of network overload.

Internet service providers, cable television networks and other data providers generally employ conductive wires and cables to transmit and receive data. Conventional approaches to signal (i.e. data) transmission through a transmission medium, such as a wire or cable, is to modulate the signal though the medium at a frequency that lies within the bounds at which the medium can electrically conduct the signal. Because of this conventional approach, the bandwidth of a specific medium is limited to a spectrum within which the medium is able to electrically transmit the signal via modulation, which yields a current flow. As a result, many costly and complicated schemes have been developed to increase the bandwidth in conventional conductive wire and/or cable systems using sophisticated switching schemes or signal time-sharing arrangements. Each of these methods is rendered costly and complex in part because the data transmission systems adhere to the conventional acceptance that the bandwidth of a wire or cable is constrained by its conductive properties.

Therefore, there exists a need for a method to increase the bandwidth of conventional wire networks.

SUMMARY OF THE INVENTION

The present invention provides a method to transmit ultra-wideband signals across any wire medium, whether the medium is twisted-pair wire, coaxial cable, fiber optic cable, or other types of wire media.

In one embodiment of the invention, a method of transmitting an ultra-wideband signal through a wire medium comprises generating an ultra-wideband pulse, the ultra-wideband pulse including a first section representing a first data symbol, and a second section representing a second data symbol. Another embodiment of the present invention comprises a method of transmitting an ultra-wideband signal through a wire medium that includes an ultra-wideband pulse structured to transmit data through a wire medium, with the ultra-wideband pulse comprising an amplitude that represents a first data symbol. The ultra-wideband pulse also includes a plurality of time bins, with each time bin representing a second data symbol. This embodiment ultra-wideband signal thus transmits two distinct data symbols, increasing the bandwidth of the wire media.

One feature of the present invention is that an ultra-wideband signal can be transmitted simultaneously with a traditional cable television signal, Internet connection signal or voice transmission signal. Because the ultra-wideband signal can be transmitted substantially simultaneously with the other signals, the overall bandwidth or capability of the system to transmit data is vastly increased.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Generally, a traditional cable television provider, a community antenna television provider, a community access television provider, a cable television provider, a hybrid fiber-coax television provider, an Internet service provider, or any other provider of television, audio, voice and/or Internet data receives broadcast signals at a central station, either from terrestrial cables, and/or from one or more antennas that receive signals from a communications satellite. The broadcast signals are then distributed, usually by coaxial and/or fiber optic cable, from the central station to nodes located in business or residential areas.

For example, community access television provider (CATV) networks are currently deployed in several different topologies and configurations. The most common configurations found today are analog signals transmitted over coaxial cable and Hybrid Fiber-Coax Systems (HFCS) that employ both fiber optic and coaxial cables. The analog coax systems are typically characterized as pure analog systems. Pure analog CATV systems are characterized by their use of established NTSC/PAL (National Television Standards Committee/Phase Alternation Line) modulation onto a frequency carrier at 6 or 8 MHz intervals.

HFCS is a combination analog—digital topology employing both coaxial (analog) and fiber optic (digital) media that typically supports digitally modulated/encoded television channels above channel 78. According to ANSI/EIA-542-1997, in the United States, the analog channels are modulated in 6 MHz allocations on channels 2 to 78 using frequencies from 55 to 547 MHz. When using HFCS, digital channels typically start at channel 79 and go as high as 136 and occupy a frequency range from 553 to 865 MHz. In some extended HFCS systems, channel assignments can go as high as channel 158 or 997 MHz. The current ANSI/EIA-542-1997 standard only defines and assigns channels to these limits. The actual wire/cable media itself is generally capable of transmitting frequencies up to 3 GHz.

In both CATV and HFCS systems, typically the satellite downlink enters the cable company's head-end and the video, and/or other data streams are de-multiplexed out. Individual video data streams (either NTSC, MPEG, or any other suitable protocol) are extracted from the satellite downlink stream and routed to modulators specific for individual television channels. The outputs from each modulator are then combined into one broadband signal. From this point the combined channels are amplified and sent out, either by coaxial or fiber optic cable, to the customers.

In a HFCS, before the combined broadband signal leaves the head-end the broadband signal is modulated onto a fiber optic cable for distribution into the field, such as residential neighborhoods, or business districts. Modulation of the broadband signal is typically accomplished in one of two ways. In the first method the entire broadband signal is sampled and digitized using a high speed Analog to Digital Converter (ADC). To perform reliable digital sampling, the data must be sampled at a rate at least twice the highest frequency component to meet Nyquist minimum sampling requirements. To provide a higher quality data stream, the signal should be sampled at 2.5 to 4 times the highest frequency, which entails sample rates of approximately 2 to 4 GHz. A parallel to serial converter then shifts the parallel output data of the ADC into a serial format. The serial data then drives a laser diode for transmission over the fiber optic cable. The second method is broadband block conversion where the entire spectrum of the broadband signal is modulated onto the fiber optic cable.

Designated access nodes are located in neighborhoods, business districts and other areas. The access nodes contain a high speed Digital to Analog Converter (DAC) and a de-serializer. A fiber optic receiver detects the laser-modulated signal at the access node. A parallel to serial converter de-serializes the data and it is feed to the high speed DAC. The data then leaves the access node on standard 75 ohm, RG-6 or RG-8 or other suitable coax cable and is distributed to the customer's premises. Thus, at the access node, the broadband signal is extracted from the fiber optic cable and transferred to a coaxial cable that connects to individual homes, apartments, businesses, universities, and other customers. Support of multiple customers is generally accomplished by the use of distribution boxes in the field, for example, on telephone poles or at ground level. However, as the signal is continuously split at the distribution boxes, the received bandwidth is reduced and the quality of the signal is diminished, thereby diminishing the video, audio, and other data quality.

The digital channels that generally reside on CATV channels 79 and higher are fundamentally different than the analog channels that generally reside on channels 2 through 78. The analog channels are comprised of modulated frequency carriers. The digital channels, which generally use the 6 MHz allocation system, are digitally modulated using Quadrature Amplitude Modulation (QAM). QAM is a method of combining two amplitude modulated signals into a single channel, thereby doubling the effective bandwidth. In a QAM signal, there are two carriers, each having the same frequency but differing in phase by 90 degrees. The two modulated carriers are combined for transmission, and separated after transmission. QAM 16 transmits 16 bits per signal, QAM 32, 64, and 256 each transmit 32, 54 and 256 bits per signal, respectively. QAM was developed to support additional video streams encoded with MPEG video compression. Conventional CATV and HFCS networks may employ QAM levels up to QAM 64 to enable up to 8 independent, substantially simultaneous MPEG video streams to be transmitted.

At the customer's location, the coaxial cable is connected to either a set-top box or directly to a television. The receiving device then de-multiplexes and de-modulates the video, audio, voice, Internet or other data. Although a television can directly receive the analog signal, a set-top box is generally required for reception of the digitally encoded channels residing on CATV channels 79 and higher.

The above-described networks, and other networks and communication systems that employ wire media, such as twisted-pair or coaxial cable, suffer from performance limitations caused by signal interference, ambient noise, and spurious noise. In these conventional wire media systems, these limitations affect the available system bandwidth, distance, and carrying capacity of the system, because the noise floor and signal interference in the wire media rapidly overcome the signal transmitted. Therefore, noise within the wire media significantly limits the available bandwidth of any wire system or network.

Generally, the conventional wisdom for overcoming this limitation is to boost the power (i.e., increase the voltage of the signal) at the transmitter to boost the voltage level of the signal relative to the noise at the receiver. Without boosting the power at the transmitter, the receiver is unable to separate the noise from the desired signal. Thus, the overall performance of wire media systems is still significantly limited by the accompanying noise that is inherent in wire media.

Increasing the available bandwidth of an established wire media network, while coexisting with the conventional data signals transmitted through the network, represents an opportunity to leverage the existing wire media network infrastructure to enable the delivery of greater functionality. Several methods and techniques have been proposed, but they are generally computationally intense, hence costly.

The present invention may be employed in any type of network that uses wire media, in whole, or in part. That is, a network may use both wire media, such as coaxial cable, and wireless devices, such as satellites. As defined herein, a network is a group of points or nodes connected by communication paths. The communication paths may be connected by wires, or they may be wirelessly connected. A network as defined herein can interconnect with other networks and contain subnetworks. A network as defined herein can be characterized in terms of a spatial distance, for example, such as a local area network (LAN), a personal area network (PAN), a metropolitan area network (MAN), and a wide area network (WAN), among others. A network as defined herein can also be characterized by the type of data transmission technology in use on it, for example, a TCP/IP network, and a Systems Network Architecture network, among others. A network as defined herein can also be characterized by whether it carries voice, data, or both kinds of signals. A network as defined herein can also be characterized by who can use the network, for example, a public switched telephone network (PSTN), other types of public networks, and a private network (such as within a single room or home), among others. A network as defined herein can also be characterized by the usual nature of its connections, for example, a dial-up network, a switched network, a dedicated network, and a nonswitched network, among others. A network as defined herein can also be characterized by the types of physical links that it employs, for example, optical fiber, coaxial cable, a mix of both, unshielded twisted pair, and shielded twisted pair, among others.

The present invention employs a "carrier free" architecture, which does not require the use of high frequency carrier generation hardware, carrier modulation hardware, stabilizers, frequency and phase discrimination hardware or other devices employed in conventional frequency domain communication systems. The present invention dramatically increases the bandwidth of conventional networks that employ wire media, but can be inexpensively deployed without extensive modification to the existing wire media network.

The present invention provides increased bandwidth by injecting, or otherwise super-imposing an ultra-wideband (UWB) signal into the existing data signal and subsequently recovers the UWB signal at an end node, set-top box, subscriber gateway, or other suitable location. Ultra-wideband, or impulse radio, employs pulses of electromagnetic energy that are emitted at nanosecond or picosecond intervals (generally tens of picoseconds to a few nanoseconds in duration). For this reason, ultra-wideband is often called "impulse radio." Because the excitation pulse is not a modulated waveform, UWB has also been termed "carrier-free" in that no apparent carrier frequency is evident in the radio frequency (RF) spectrum. That is, the UWB pulses are transmitted without modulation onto a sine wave carrier frequency, in contrast with conventional radio frequency technology. Ultra-wideband generally requires neither an assigned frequency nor a power amplifier.

Conventional radio frequency technology employs continuous sine waves that are transmitted with data embedded in the modulation of the sine waves' amplitude or frequency. For example, a conventional cellular phone must operate at a particular frequency band of a particular width in the total frequency spectrum. Specifically, in the United States, the Federal Communications Commission has allocated cellular phone communications in the 800 to 900 MHz band. Cellular phone operators use 25 MHz of the allocated band to transmit cellular phone signals, and another 25 MHz of the allocated band to receive cellular phone signals.

Figure 1:
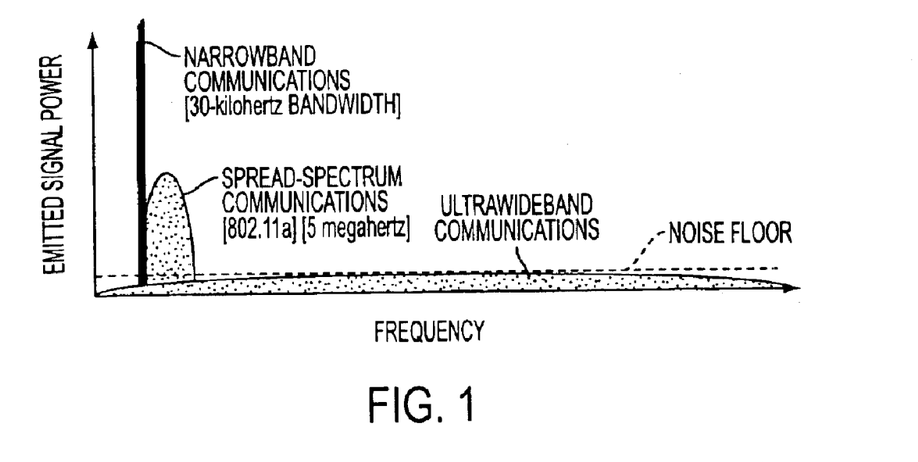
FIG. 1 is an illustration of different communication methods.

Another example of a conventional radio frequency technology is illustrated in FIG. 1. 802.11a, a wireless local area network (LAN) protocol, transmits radio frequency signals at a 5 GHz center frequency, with a radio frequency spread of about 5 MHz.

Figure 2:
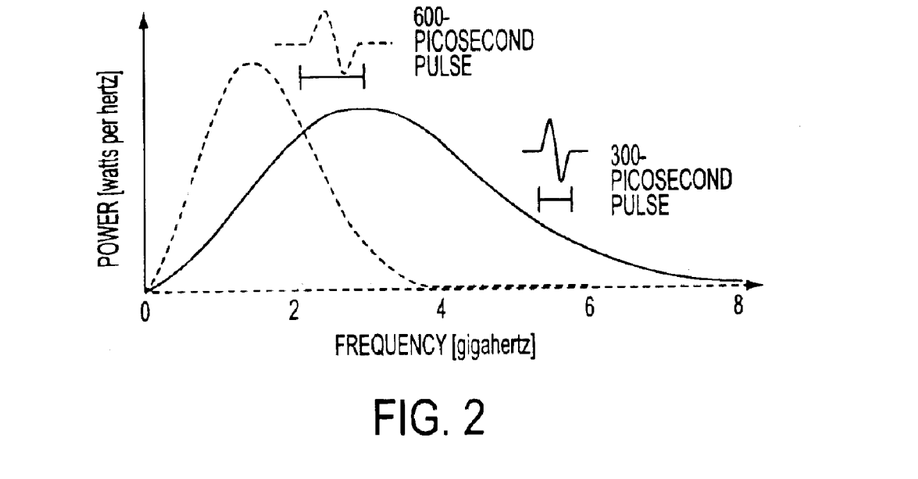
FIG. 2 is an illustration of two ultra-wideband pulses.

In contrast, a UWB pulse may have a 1.8 GHz center frequency, with a frequency spread of approximately 4 GHz, as shown in FIG. 2, which illustrates two typical UWB pulses. FIG. 2 illustrates that the narrower the UWB pulse in time, the higher its center frequency and the broader the spread of its frequency spectrum. This is because frequency is inversely proportional to the time duration of the pulse. A 600 picosecond UWB pulse will have about a 1.8 GHz center frequency, with a frequency spread of approximately 4 GHz. And a 300 picosecond UWB pulse will have about a 3 GHz center frequency, with a frequency spread of approximately 8 GHz. Thus, UWB pulses generally do not operate within a specific frequency, as shown in FIG. 1. And because UWB pulses are spread across an extremely wide frequency range, UWB communication systems allow communications at very high data rates, such as 100 megabits per second or greater.

Further details of UWB technology are disclosed in U.S. Pat. No. 3,728,632 (in the name of Gerald F. Ross, and titled: Transmission and Reception System for Generating and Receiving Base-Band Duration Pulse Signals without Distortion for Short Base-Band Pulse Communication System), which is referred to and incorporated herein in its entirety by this reference.

Also, because the UWB pulse is spread across an extremely wide frequency range, the power sampled at a single, or specific frequency is very low. For example, a UWB one-watt signal of one nano-second duration spreads the one-watt over the entire frequency occupied by the pulse. At any single frequency, such as at the carrier frequency of a CATV provider, the UWB pulse power present is one nano-watt (for a frequency band of 1 GHz). This is well within the noise floor of any wire media system and therefore does not interfere with the demodulation and recovery of the original CATV signals. Generally, the multiplicity of UWB pulses are transmitted at relatively low power (when sampled at a single, or specific frequency), for example, at less than −30 power decibels to −60 power decibels, which minimizes interference with conventional radio frequencies. However, UWB pulses transmitted through most wire media will not interfere with wireless radio frequency transmissions. Therefore, the power (sampled at a single frequency) of UWB pulses transmitted though wire media may range from about +30 dBm to about −90 dBm.

For example, a CATV system generally employs a coaxial cable that transmits analog data on a frequency carrier. Generally, amplitude modulation (AM) or QAM (discussed above) are used to transmit the analog data. Since data transmission employs either AM or QAM, UWB signals can coexist in this environment without interference. In AM, the data signal M(t) is multiplied with a cosine at the carrier frequency. The resultant signal y(t) can be represented by:

$$y(t)=m(t)\mathrm{Cos}(\omega_c t)$$

In a QAM based system multiple carrier signals are transmitted at the same carrier frequency, but at different phases.

This allows multiple data signals to be simultaneously carried. In the case of two carriers, an "in phase" and "quadrature" carriers can carry data signals Mc(t) and Ms(t). The resultant signal y(t) can be represented as:

$$y(t)=Mc(t)\text{Cos}(\omega_c t)+Ms(t)\text{Sin}(\omega_c t)$$

However, as discussed above, an UWB system transmits a narrow time domain pulse, and the signal power is generally evenly spread over the entire bandwidth occupied by the signal. At any instantaneous frequency, such as at the AM or QAM carrier frequency, the UWB pulse power present is one nano-watt (for a frequency band of 1 GHz). This is well within the noise floor of any wire media system and therefore does not interfere with the demodulation and recovery of the original AM or QAM data signals.

Wire media communication systems suffer from performance limitations caused by signal interference, ambient noise, and spurious noise. These limitations affect the available bandwidth, distance, and carrying capacity of the wire media system. With wired communication systems, the noise floor and signal interference in the wire media rapidly overcome the transmitted carrier signal. This noise on the wire media is a significant limitation to the ability of the system to increase bandwidth. UWB technology makes use of the noise floor to transmit data, without interfering with the carrier signal. Moreover, UWB transmitted through a wire medium has distinct advantages over its use in a wireless environment. In a wire environment there are no concerns with intersymbol interference, and there are no concerns relating to multi-user interference.

For example, CATV channels typically occupy 6 MHz in the US and 8 MHz in Europe. These channels are arranged in a re-occurring pattern beginning at approximately 50 MHz and dependent on the CATV system, extend upward to 550 MHz, 750 MHz, 870 MHz, 1 GHz and higher. The present invention is capable of injecting UWB pulses into the existing CATV infrastructure. These UWB signals do not interfere or degrade existing frequency domain signals. Additionally, the UWB signals can carry vast amounts of information with digital meaning in the time domain.

Figure 3:
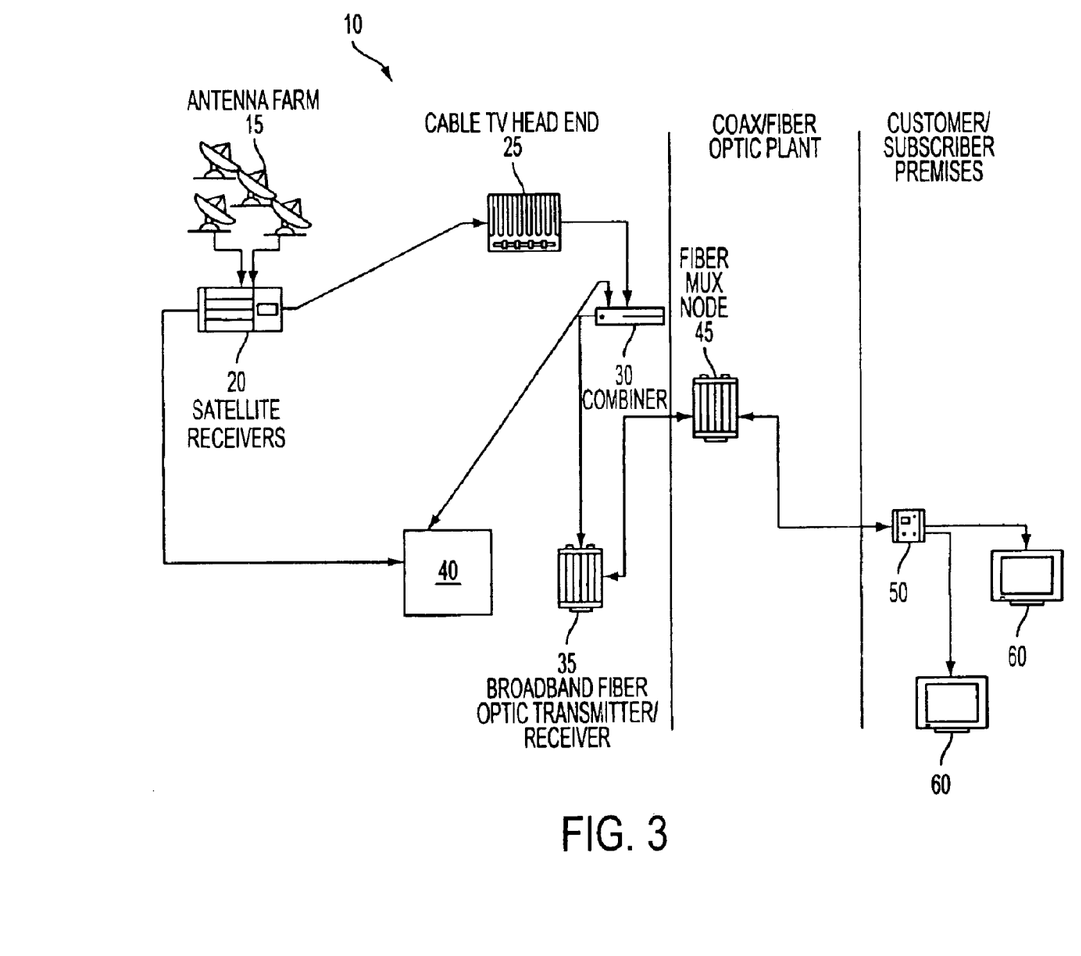
FIG. 3 is a schematic illustration of one embodiment of an ultra-wideband communication system employing a wire medium.
Figure 4:
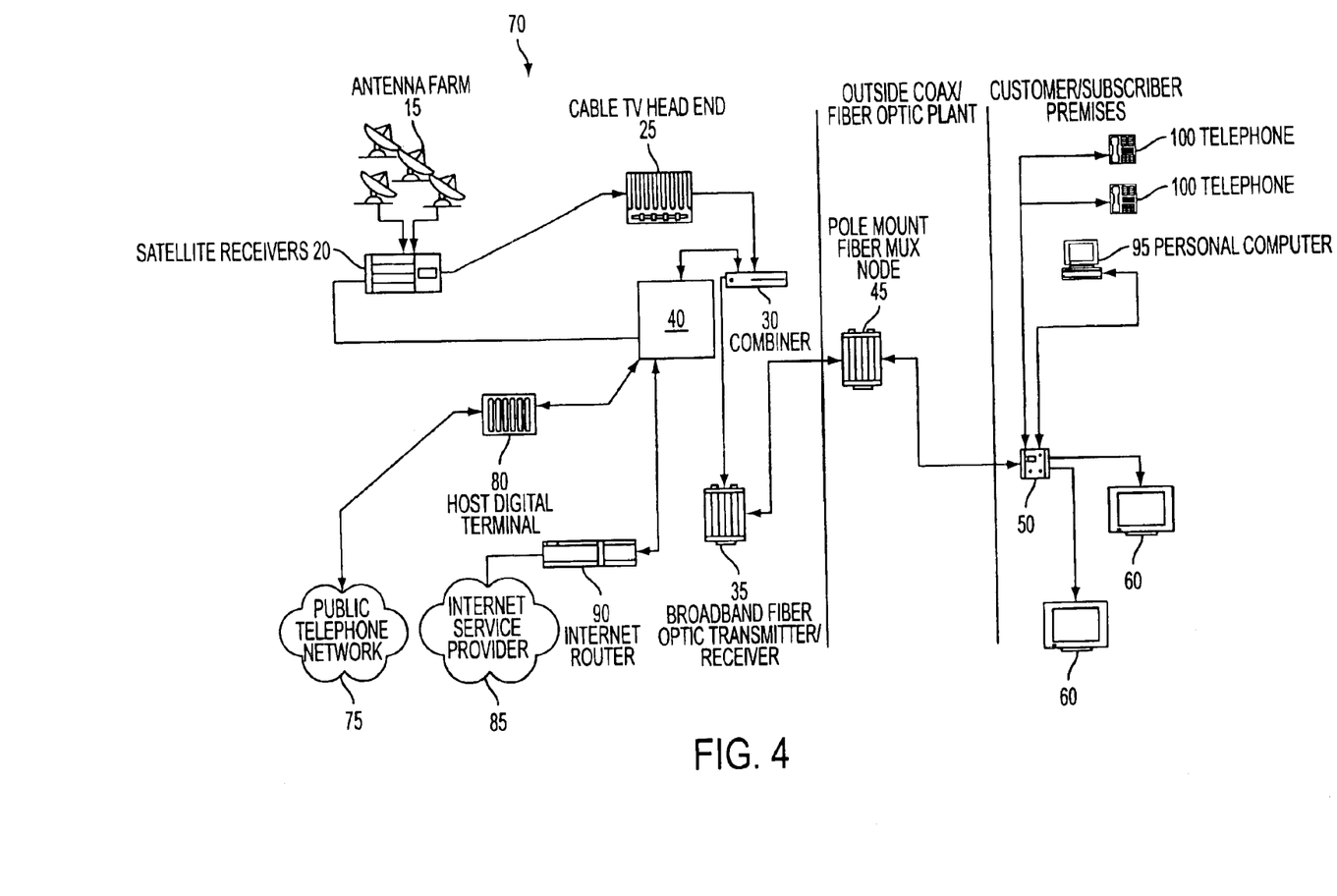
FIG. 4 is a schematic illustration of a second embodiment of an ultra-wideband communication system employing a wire medium.

The present invention provides an apparatus and method to enable any wire media network to augment their available bandwidth. Preferably, this additional bandwidth is obtained by introducing UWB signals into the existing data transmission chain prior to broadcast from the system operator's head-end. As shown in FIGS. 3 and 4, the head-end may include several components, such as the antenna farm 15, the satellite receivers 20, the channel modulator 25, the combiner 30, and the fiber optic transmitter/receiver 35. Alternatively, UWB signals may be introduced into the wire media network at other locations, such as at the Internet router 90 or at the host digital terminal 80, or at any other suitable location.

In like fashion, cable system operators can receive more data from individual subscribers by introducing subscriber-generated data into existing upstream channels. The present invention provides UWB communication across fiber optic and coaxial cable, twisted pair wires, or any other type of conductive wire. A wire media network will be able to both transmit and receive digital information for the purposes of telephony, high-speed data, video distribution, video conferencing, wireless base operations and other similar purposes.

Referring to FIG. 3, the wired ultra-wideband communication system 10 is configured to transmit ultra-wideband signals over an existing network or system that includes wire media. For example, the wired ultra-wideband (UWB) system 10 may transmit UWB signals over an existing community access television network (CATV), an optical network, a cable television network, a community antenna television network, a hybrid fiber-coax television network, an Internet service provider network, a PSTN network, a WAN, LAN, MAN, PAN, TCP/EP network, a college campus, town, city, or any other type of network as defined above, that employs wire media, in whole or in part.

One embodiment of the wired UWB communication system 10 is illustrated in FIG. 3. An antenna farm 15 receives audio, video and data information from one or more satellites (not shown). Additional data may be received by terrestrial cables and wires and by terrestrial wireless sources, such as a multichannel multipoint distribution service (MMDS). The data is then forwarded to the satellite receivers 20 that demodulate the data into separate audio, video and data streams. This information is forwarded to the channel modulators 25 that receive the program signals, such as CNN or MTV. The channel modulators 25 mix each signal with a radio frequency (RF) and assign a station number (such as 2 to 99) that each program will be received on by subscribers.

The multiple RF signals are then forwarded to a combiner 30 that combines the multiple signals into a single output. That is, the combiner 30 receives the program signals from the channel modulators 25 and combines them onto a single coax cable and forwards the signal to the fiber optic transmitter/receiver 35. The above-described arrangement and function of channel modulators 25 and combiners 30 may vary with each type of wire media network.

Additional audio, video, or other data signals received from either the antenna farm 15 or from terrestrial sources such as fiber optic or coaxial cables can be routed from the satellite receiver 20 to the service provider ultra-wideband (UWB) device 40. The service provider UWB device 40 converts the audio, video, or other data signals received from the satellite receiver 20 into a multiplicity of UWB electromagnetic pulses. One embodiment of the service provider UWB device 40 may function as a transmitter and as a receiver, to both transmit and receive UWB pulses.

The service provider UWB device 40 may include several components, including a controller, digital signal processor, an analog coder/decoder, a waveform generator, an encoder, static and dynamic memory, data storage devices, a receiver, an amplifier, an interface, one or more devices for data access management, and associated cabling and electronics. One or more of the above-listed components may be co-located or they may be separate devices, and the service provider UWB device 40 may include some, or all of these components, other necessary components, or their equivalents. The controller may include error control, and data compression functions. The analog coder/decoder may include an analog to digital conversion function and vice versa. The data access management device or devices may include various interface functions for interfacing to wire media such as phone lines and coaxial cables. Alternative embodiments of the UWB device 40 may employ hard-wired circuitry used in place of, or in combination with software instructions. Thus, embodiments of the UWB device 40 are not limited to any specific combination of hardware or software.

The digital signal processor in the service provider UWB device 40 modulates the audio, video, or other data signals received from the satellite receiver 20 into a multiplicity of UWB electromagnetic pulses, and may also demodulate UWB pulses received from the subscriber. As defined herein, modulation is the specific technique used to encode the audio, video, or other data into a multiplicity of UWB pulses. Because UWB does not use a conventional carrier wave, the transmitted pulses, or waveforms themselves must contain the information being communicated. That is, the UWB pulses themselves contain the desired information.

For example, the digital signal processor and/or waveform generator may modulate the received audio, video, or other data signals into a multiplicity of UWB pulses that may have a duration that may range between about 0.1 nanoseconds to about 100 nanoseconds, and may be transmitted at relatively low power, for example, at less than −10 power decibels to −60 power decibels, as measured at a single frequency.

The UWB pulse duration and transmitted power may vary, depending on several factors. Different modulation techniques employ different UWB pulse timing, durations and power levels. The present invention envisions several different techniques and methods to transmit an UWB signal across a wire medium. One embodiment, may for example, may transmit the UWB signal in a fashion similar to that described in U.S. patent application titled, "ENCODING AND DECODING ULTRA-WIDEBAND INFORMATION," Ser. No. 09/802,590 (in the name of John H. Santhoff and Rodolfo T. Arrieta), which is referred to and incorporated herein in its entirety by this reference.

Other envisioned modulation techniques include On-Off Keying that encodes data bits as pulse (1) or no pulse (0), and Binary Phase-Shift Keying (BPSK), or bi-phase modulation. BPSK modulates the phase of the signal (0 degrees or 180 degrees), instead of modulating the position.

Figure 5:
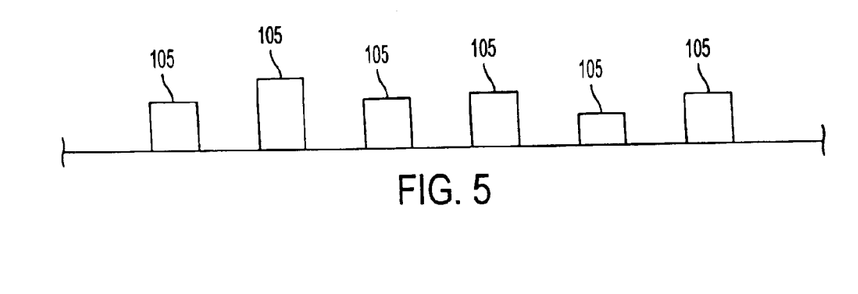
FIG. 5 is an illustration of exemplary ultra-wideband pulses constructed according to the present invention.
Figure 6:
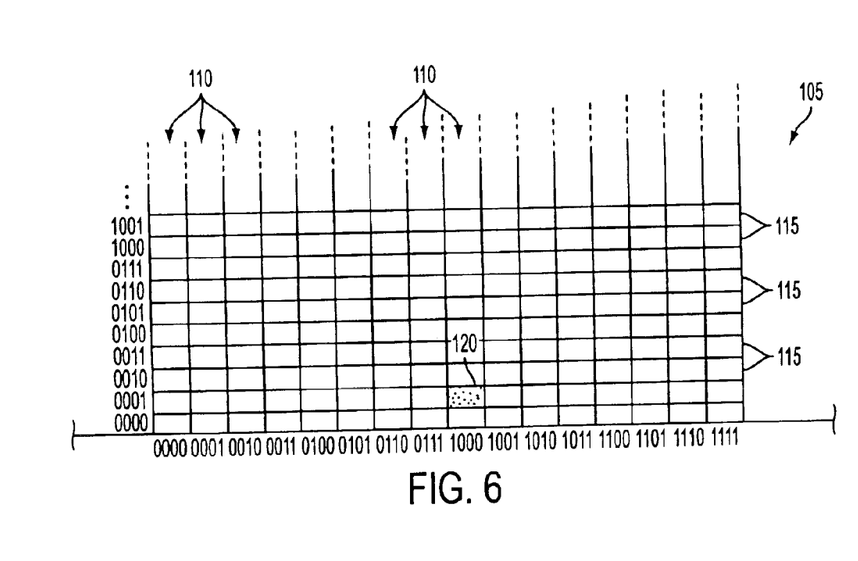
FIG. 6 is an illustration of a single ultra-wideband pulse as shown in FIG. 5.

FIGS. 5–6 illustrate three types of modulation techniques employed by the present invention: pulse amplitude modulation (PAM), pulse position modulation (PPM), and a combined form of PAM and PPM, which will be called PQAM. FIG. 5 illustrates several UWB pulses 105. PAM encodes or designates data in the amplitude of the UWB pulse. As illustrated, each UWB pulse 105 may have a specific amplitude, or height 115. The amplitude 115 of each UWB pulse 105 can designate, or represent a specific bit value. For example, as shown in FIG. 6, the amplitude 115 of an UWB pulse 105 may be varied by specific increments with each increment designating a different bit value. Specifically, as shown, in part, in FIG. 6, the UWB pulse 105 has 16 discrete amplitudes 115. The first discrete amplitude 115 designates a bit value of 0000, with the second discrete amplitude 115 designating a bit value of 0001, and the third discrete amplitude 115 designating a bit value of 0010. The bit value may vary. For example, each specific amplitude 115 of the UWB pulse 105 may designate 3 bits, 4 bits (shown in FIG. 6), 8, 16, 32, 64, 128, 256 or 512 discrete bits. In practice, for example, an UWB pulse train may include a multiplicity of pulses, with each pulse having a different amplitude 115, representing a different bit value, as shown in FIG. 5.

In addition, the number of discrete amplitudes 115 may vary. For example, one embodiment of the present invention may employ 32 different amplitudes 115. If 5 bits were encoded in each pulse, then a PAM32 modulation method would allow 100 million pulses, or symbols per second to carry 500 million bits per second. This number can be realized because in an average UWB pulse recurrent frequency of 100 Mhz there are 100 million symbols transmitted per second. If each symbol carries 5 bits, 500 million bits per second can be transmitted.

An alternative modulation technique, of pulse position modulation (PPM) constructed according to the present invention for transmitting UWB pulses through a wire medium is also illustrated in FIG. 6. Each UWB pulse 105 is divided into discrete time bins 110. FIG. 6 illustrates a UWB pulse 105 that includes 16 discrete time bins 110. Each time bin 110 represents a specific bit value. For example, as illustrated, a first time bin 110 may represent a bit value of 0000 and an adjacent time bin 110 may represent a bit value of 0001. When the UWB pulse 105 is received at a UWB receiver, the pulse is sampled at a designated time bin 110 and the representative bit value is obtained. In this fashion, a representation of any number of bits can be transmitted with each UWB pulse 105. For example, a specific time bin may represent 3, 4, 8, 16, 32, 64, 128, 256 or more bits. The above-described PPM method transmitting 4 bits per pulse, would carry 400 million bits per second, with a UWB pulse rate of 100 MHz. Alternative embodiments of the present invention may employ more, or less than 16 discrete time bins 110. For example, the number of time bins may range from 3 to 256 or more time bins 110.

Also illustrated in FIG. 6 is an alternative modulation technique, the so-called PQAM, constructed according to the present invention. This alternative modulation scheme comprises a UWB pulse 105 that is modulated to include specific time bins 110 as well as specific amplitudes 115. This modulation scheme allows the transmission of a bit value that represents twice the number of bits than some of the above-described modulation methods. By combining the detected arrival time (PPM) and the detected amplitude (PAM), PQAM can carry 8 bits of information per pulse, when PPM and PAM are each transmitting 4 bits. Thus, PQAM is capable of transmitting 800 million bits per second, with a UWB pulse transmission rate of 100 MHz.

Specifically, as illustrated in FIG. 6, PQAM includes a time bin value 110 as well as a pulse amplitude 115 value. In one embodiment, an UWB receiver will receive a UWB pulse 105 and obtain a bit value assigned to a specific time bin 110 as well as a bit value assigned to a specific amplitude 115. For example, inter-pulse location 120 includes a time bin 110 bit value of 1001 and an amplitude 115 bit value of 0001. Therefore, a representation, or symbol corresponding to 8 bits (10010001) is transmitted by a single UWB pulse 105. Alternative UWB pulses 105 employing this modulation method may transmit a symbol or representation that corresponds to 16, 32, 64, 128, 256 or more bits in a single UWB pulse 105.

Referring to FIGS. 7a–7h and 8a–8h, an alternative UWB modulation scheme is illustrated. FIGS. 7a–7h illustrate rectangular coordinate representations of different data bits, or data bit symbols 125. Each circle represents a specific bit value. For example, symbol 125a represents a bit value of 010101. This bit value is determined by combining the bit value assigned to the X-axis as well as the Y-axis for each circle. For example, the circle located in the lower left corner of the -X and -Y region has a bit value of 000. The adjacent circle is assigned a bit value of 001 and the circle adjacent to that one along the same row is designated 010. The designation of bit values uses the conventional binary numbering system. Referring again to FIGS. 7a–7h, only three bits are assigned to each axis and therefore the bit value for symbol 125b is 111111, the bit value for symbol 125c is 010101, the bit value for symbol 125d is 100101, the bit value for symbol 125e is 000001, the bit value for symbol 125f is 000110, the bit value for symbol 125g is 011011, and the bit value for symbol 125h is 000100.

Alternative embodiments of the present invention may assign 4, 8, 16, 32, 128, 256 or 512 bits to each circle on each axis of the rectangular coordinate representation. For example, if 16 bits are assigned to each location on the X-axis, and 16 bits are assigned to each location on the Y-axis, then each data bit symbol 125 would represent 32 bits.

Figure 8A:
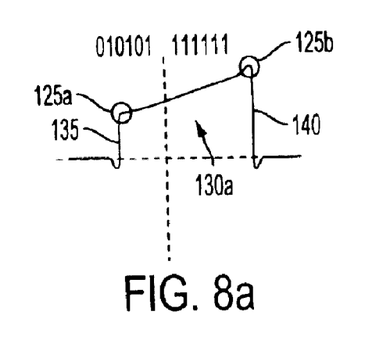
FIGS. 8a–8h illustrate ultra-wideband pulses constructed according to an alternative embodiment of the present invention, with corresponding ultra-wideband pulses constructed to transmit corresponding data bit representations, as illustrated in FIGS. 7a–7h.

Now referring to FIGS. 8a–8h, a sloped UWB pulse 130 is illustrated. The sloped UWB pulse 130a includes a first section, or edge 135 and a second section, or edge 140. The height of the first section 135 corresponds to the bit symbol 125a, illustrated in FIG. 7a. Similarly, the height of the second section 140 corresponds to the bit symbol 125b, illustrated in FIG. 7a. Thus, a single sloped UWB pulse 130 can include two bit symbols 125. And, as shown in FIG. 8a, each bit symbol represents, in this embodiment, six specific bits. Therefore, each sloped UWB pulse 130 can transmit two bit symbol 125 representations, totaling 12 bits.

In comparison to the pulse modulation scheme illustrated in FIG. 6, the sloped UWB pulse 130 can transmit twice the number of symbols and thus twice the amount of represented bits. For example, if each axis of the rectangular coordinate representation in FIG. 7a included four bits, then the total number of bits transmitted by data bit symbol 125a would be 8 bits. Thus, the first section 135 of the sloped UWB pulse 130, shown in FIG. 8a, would include a bit symbol 125a that represents 8 bits. The second section 140 would also include a bit symbol 125b that represents 8 bits. Thus, the combined represented bit data from one sloped UWB pulse 130 is 16 bits. This is twice the number of bits transmitted by the single UWB pulse 105 illustrated in FIG. 6. This "sloped amplitude modulation" (SLAM) method of the present invention doubles the amount of data transmitted per UWB pulse. Therefore, twice the amount of data can be transmitted without increasing the pulse repetition frequency or energy level of the UWB pulse train.

Figure 7A:
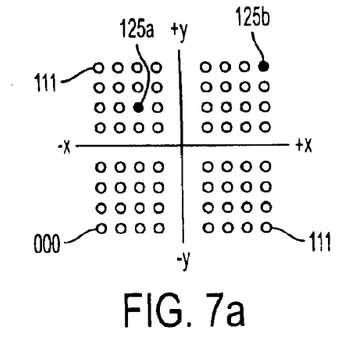
FIGS. 7a–7h illustrate rectangular coordinate representations of data bits.
Figure 7B:
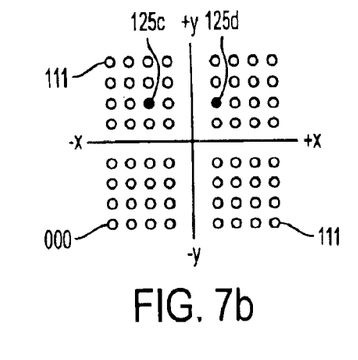
Figure 7C:
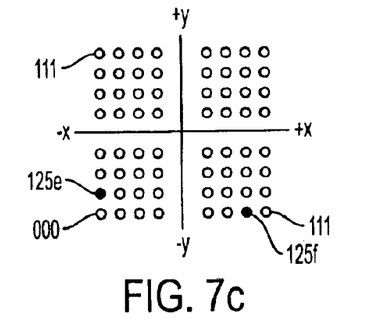
Figure 7D:
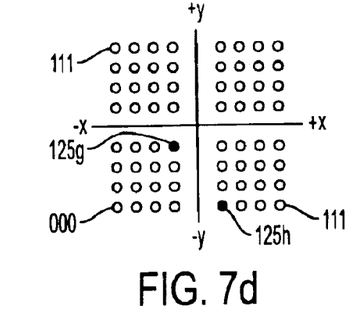
Figure 7E:
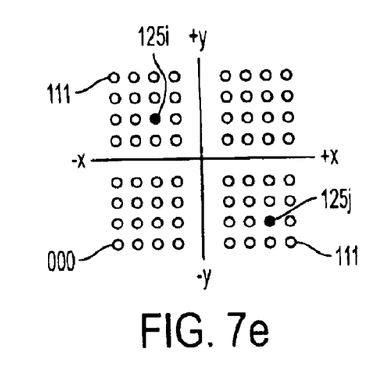
Figure 7F:
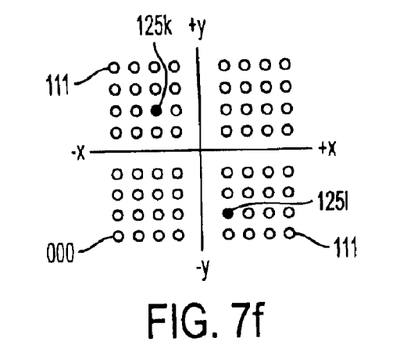
Figure 8B:
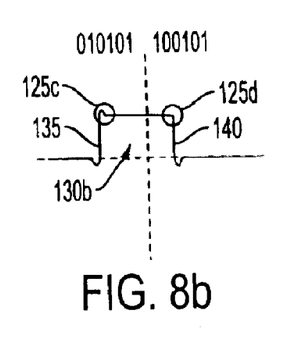
Figure 8C:
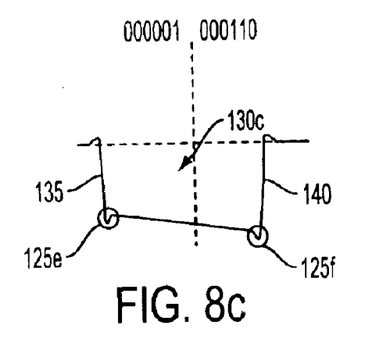
Figure 8D:
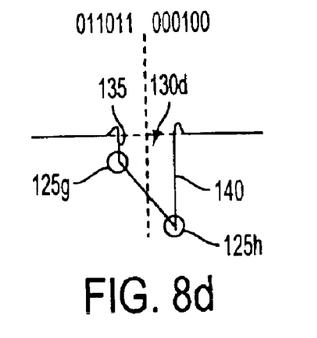
Figure 8E:
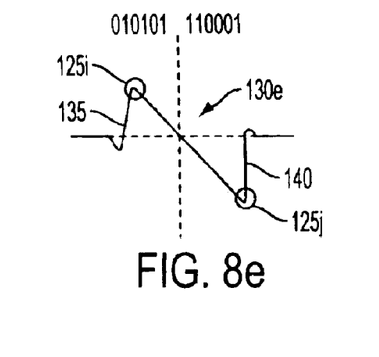
Figure 8F:
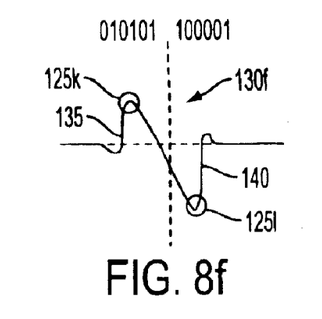

As shown in FIG. 8b, sloped UWB pulse 130 must not always include a slope between the first section 135 and the second section 140. In this instance, sloped UWB pulse 130b includes bit symbols 125c and 125d that have similar amplitudes or heights. In this case, bit symbol 125c represents bits 010101 and bit symbol 125d represents bits 100101, as illustrated in FIG. 7b. In addition, a sloped UWB pulse 130 may also be a negative pulse, as illustrated in FIGS. 8c and 8d. Sloped UWB pulse 130c includes bit symbols 125e and 125f. These bit symbols represent bits 000001 and 000110, respectively, as illustrated in FIG. 7c. Sloped UWB pulse 130d, shown in FIG. 8d, includes bit symbol 125g (011011) and bit symbol 125h (000100).

Figure 7G:
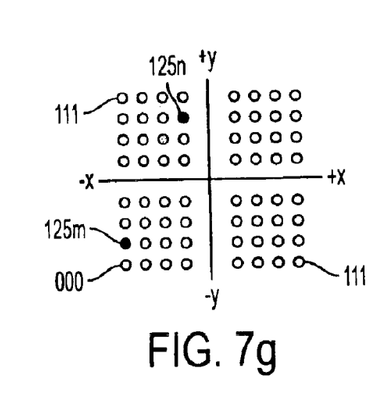
Figure 7H:
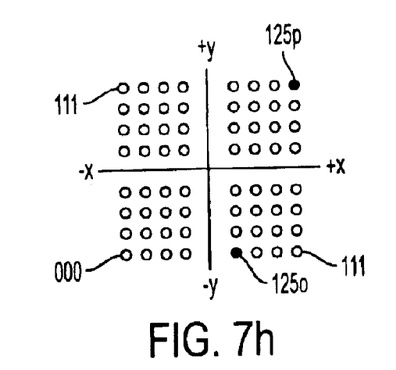
Figure 8G:
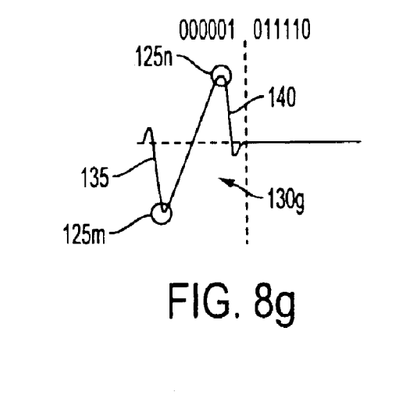
Figure 8H:
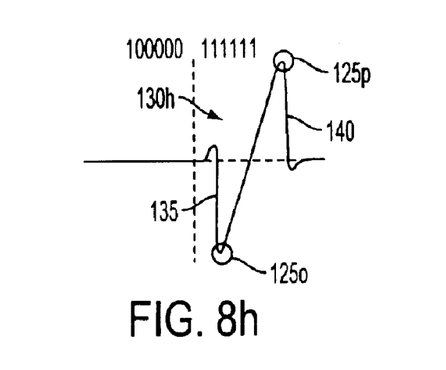

Moreover, other sloped UWB pulses 130 may include UWB pulses with first sections 135 that are positive and second sections 140 that are negative, or vice-versa, as shown in FIGS. 8e–8h. Specifically, sloped UWB pulse 130e, shown in FIG. 8e, includes bit symbol 125i and bit symbol 125j that represent bit values, illustrated in FIG. 7e, of 010101 and 110001, respectively. Sloped UWB pulse 130f, illustrated in FIG. 8f, includes a positive first section 135 and a negative second section 140 that include bit symbols 125k (010101) and 125l (100001), respectively. FIG. 8g illustrates a sloped UWB pulse 130g that includes a negative first section 135 and a positive second section 140. Bit symbol 125m represents bits 000001 and bit symbol 125n represents bits 011110, as shown in FIG. 7g. Similarly, as shown in FIG. 8a, sloped UWB pulse 130h includes bit symbol 125o and bit symbol 125p that represent bit streams 100000 and 111111, respectively, as illustrated in FIG. 7h. The above-described SLAM method of the present invention can provide twice the bit symbol rate of conventional modulation techniques, with no additional bandwidth consumption. The expected bandwidth increase for a conventional CATV or HFCS system will be 100's of megabits per second, which will allow cable providers, and other wire networks to provide new services without adding costly infrastructure upgrades.

It will be appreciated that other modulation techniques, currently existing or yet to be conceived, may also be employed.

One possible modulation technique will optimize signal coexistence and pulse reliability by controlling transmission power, pulse envelope shape and Pulse Recurrent Frequencies (PRF). Both pseudo-random and fixed PRFs may be used, with the knowledge that a fixed PRF may create a "carrier-like frequency," which it and its higher order harmonics may interfere with the data carried in conventional RF carrier channels. However, with a pseudo-random PRF the difficulties encountered with a fixed PRF are usually avoided. One embodiment of a pseudo-random PRF modulation technique may include a UWB pulse envelope that is shaped to pre-amplify and compensate for high frequency components that the wire media may naturally attenuate. UWB pulse envelope shaping has the additional advantage of controlling the power spectral density of the transmitted data stream.

Several advantages exist when transmitting UWB pulses through wire media as opposed to transmitting UWB pulses through a wireless medium. Wireless UWB transmissions must consider such issues as Inter-Symbol Interference (ISI) and Multi-User Interference (MUI), both of which can severely limit the bandwidth of UWB transmissions. Some modulation techniques such as Pulse Amplitude Modulation (PAM), which offer the ability for high bit densities are not effective at long wireless distances. Errors can arise in the interpretation of PAM pulses that have been transmitted long wireless distances (the so-called ISI problem). Pulse position modulation is also prone to errors when transmitted wirelessly. Reflections from objects in the vicinity of the transmitter and receiver can cause a pulse that was supposed to be at the beginning of a time window to appear at the end of the time window, or even in the time window of a subsequent pulse. This "multipath" problem effects the integrity of the data transmission. And, if a pulse cannot be interpreted correctly, the bits associated with the pulse cannot be reliably obtained, lowering bandwidth.

These, and other issues, do not apply to UWB pulses transmitted over wire media. Multipath and ISI issues do not arise and there are no propagation delay problems present in a wire medium. Therefore, the above-described modulation technologies, which until now have been used for wireless communications, can be implemented much more effectively in a wire medium. Because of the signal transmission advantages inherent in wire media, it is estimated that an ultra-wideband system may be able to transmit data across a wire medium in a range from 100 Mbit/second to 1 Gbit/second. This data rate will ensure that the bandwidth requirements of any service provider can be met.

A preferred embodiment of the service-provider UWB device 40 will spread the signal energy of the UWB data stream across the a bandwidth that may ranger from 50 MHz to approximately 870 MHz or as discussed above, to 1 GHz, or higher. This will ensure that the signal energy present at any frequency is significantly below the normal noise floor for that frequency band, further ensuring coexistence with conventional RF carrier data.

For example, a UWB pulse would have a duration of about 1 nano-second in a UWB data stream that has a 1 GHz bandwidth. Alternatively, the UWB pulse duration would be tailored to match the available frequency of the specific network. For a CATV or HFCS network located in the United States, an ideal UWB pulse would generally be about 0.5 to 2 nano-seconds in duration. This is because a conventional CATV or HFCS network located in the United States typically utilizes a maximum frequency of approximately 870 MHz, but has the capacity to utilize up to 1 GHz. This bandwidth allows for a 1 to 2 nano-second pulse duration. A narrow pulse width is preferred because more pulses can be transmitted in a discrete amount of time. Pulse widths of up to 2 nano-seconds may be employed to guarantee pulse integrity throughout digitization, transmission, reception and reformation at the UWB subscriber device 50. Generally, an idealized pulse width would be calculated based on the frequency response of the specific wire media system.

Referring to FIG. 3, the multiplicity of generated UWB pulses are sent from the service-provider UWB device 40 to the combiner 30, which combines the UWB pulses with the conventional RF carrier signals. One method to accomplish this task is to couple a wire carrying the conventional RF carrier signals to a standard coaxial splitter. A second wire carrying the UWB pulses is also coupled to the standard coaxial splitter. The combined signals are forwarded to the fiber optic transmitter/receiver 35. The fiber optic transmitter/receiver 35 converts both the multiplicity of UWB pulses and the conventional RF carrier signals received from the combiner 30 into a corresponding optical signal. The optical signal generator can be either a light-emitting diode, solid state laser diode, or other suitable device. The optical signal is then distributed on fiber optic cables to residential neighborhoods, business districts, universities, colleges or other locations for distribution to subscribers and customers. Other methods and techniques for combining a UWB pulse stream and a conventional RF carrier signal stream may also be employed. For example, the UWB pulse stream my be sent directly to the fiber optic transmitter/receiver 35, which will then combine the two signals.

Shown in FIG. 3, a fiber multiplexer node 45 may be located at any one of the locations described above. The optical signals are received by the multiplexer 45 and are converted back to the combined conventional RF carrier and UWB pulsed signals. The combined signals are forwarded to a subscriber UWB device 50. The subscriber UWB device 50 can be considered a gateway or router that provides access to the combined signals.

One embodiment of the subscriber UWB device 50 will demodulate the multiplicity of UWB electromagnetic pulses back into a conventional RF carrier signal. The subscriber UWB device 50 may include all, some or additional components found in the service provider UWB device 40. In this manner, additional bandwidth will be available to the wire media network to provide the additional data and functionality demanded by the customer.

An alternative embodiment of the present invention is illustrated in FIG. 4. A full service wired UWB communication system 70 is structured to allow for extremely high data rate transmission of video, telephone, internet and audio signals.

The full service UWB system 70 receives audio, video and data information from an antenna farm 15 or from terrestrial sources such as fiber optic or coaxial cables. These signals are forwarded to the satellite receivers 20 as described above with reference to the wired UWB communication system 10. In addition, signals from a public telephone network 75 are received by a host digital terminal 80. The host digital terminal 80 modulates multiple voice signals into two-way upstream and downstream RF signals. The voice signals from the host digital terminal 80 are forwarded to the service provider UWB device 40.

An internet service provider 85 forwards internet data to the internet router 90. The internet router 90 generates packets, such as TCP/IP packets, which are forwarded to the service provider UWB device 40.

The service provider UWB device 40 modulates the internet data, the telephony data and the data received from the satellite receivers 20 into a multiplicity of electromagnetic pulses, as described above, and forwards the pulses to the combiner 30. The combiner combines the UWB pulses with the conventional RF carrier signals and forwards the combined signal to the fiber optic transmitter/receiver 35. The signals are then converted into an optical signal by either a light emitting diode, solid state laser diode, or other suitable device. The optical signal is then distributed to the fiber multiplexer node 45 located within business districts, residential neighborhoods, universities, colleges and other areas.

The fiber multiplexer node 45 receives the fiber optic signal and converts them back to the combined conventional RF carrier and UWB pulsed signals. The combined signals are forwarded to a subscriber UWB device 50. The subscriber UWB device 50 can be considered a gateway or router that provides access to the combined signals. The subscriber UWB device 50 demodulates the multiplicity of UWB electromagnetic pulses into RF signals and forwards the RF signals to appropriate locations such as televisions, personal computers or telephones. Alternative embodiment subscriber UWB devices 50 may be located adjacent to televisions sets similar to a set-top box and used to transmit on-demand movies, internet access or pay-per-view programs. Yet another embodiment of the present invention may include a UWB device 50 that may be located within a television set, or computer. The UWB device 50 is constructed to convert and distribute data to computers, network servers, digital or subscription televisions, interactive media devices such as set-top boxes and telephone switching equipment.

The subscriber UWB device 50 may also be configured to transmit UWB pulses wirelessly to provide audio, video, and other data content to personal computers, televisions, PDAs, telephones and other devices. For example, UWB device 50 may include the necessary components to transmit and receive UWB or conventional RF carrier signals to provide access to interfaces such as PCI, PCMCIA, USB, Ethernet, IEEE1394, or other interface standards.

The present invention will also allow for data to be transmitted "upstream" toward the service provider. For example, a conventional CATV or HFCS network reserves frequencies below 50 MHz for upstream traffic. One embodiment of the present invention may include a bandpass filter with stop-bands above 1 GHz, and below 50 MHz to ensure attenuation of UWB pulses so as not to interfere with upstream traffic. These filters also serve the purpose of limiting potential inter-modulation distortion that could be introduced by the UWB pulses.

Alternative embodiments of the present invention may transmits UWB pulses through traditional telephone wires. Depending upon the provider, whether they be a local or long distance carrier, an UWB transmitter/receiver can be located in a regional center, sectional center, primary center, toll center, end-office, or their equivalents.

The present invention of transmitting ultra-wideband signals across a wire medium can employ any type of wire media. For example, the wire media can include optical fiber ribbon, fiber optic cable, single mode fiber optic cable, multi-mode fiber optic cable, plenum wire, PVC wire, coaxial cable, or any other electrically conductive or optically conductive media.

In addition, the wire media can include twisted-pair wiring, whether shielded or unshielded. Twisted-pair wire may consist of "pairs" of color-coded wires. Common sizes of twisted-pair wire are 2 pair, 3 pair, 4 pair, 25 pair, 50 pair and 100 pair. Twisted-pair wire is commonly used for telephone and computer networks. It comes in ratings ranging from category 1 to category 7. Twisted-pair wiring also is available unshielded. That is, the wiring does not have a foil or other type of wrapping around the group of conductors within the jacket. This type of wiring is most commonly used for wiring for voice and data networks. The foregoing list of wire media is meant to be exemplary, and not exclusive.

As described above, the present invention can provide additional bandwidth to enable the transmission of large amounts of data over an existing wire media network, whether the wire media network is a Internet service provider, cable television provider, or a computer network located in a business or university. The additional bandwidth can allow consumers to receive the high speed Internet access, interactive video and other features that they are demanding.

Thus, it is seen that an apparatus and method for transmitting and receiving ultra-wideband signals through a wire medium is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. Many designs other than the above-described embodiments will fall within the literal and/or legal scope of the following claims, and the present invention is limited only by the claims that follow. It is noted that various equivalents for the particular embodiments discussed in this description may practice the invention as well.

What is claimed is:

1. A method of transmitting data through a wire medium, comprising the steps of:
   providing the wire medium;
   generating an ultra-wideband pulse, the ultra-wideband pulse including a first section representing a first data symbol, and a second section representing a second data symbol.

2. The method of transmitting data of claim 1, wherein the first data symbol represents a first group of binary digits, and the second data symbol represents a second group of binary digits.

3. The method of transmitting data of claim 1, wherein the first and second data symbols each represent a multiplicity of binary digits.

4. The method of transmitting data of claim 1, wherein the first and second data symbols each represent a group of binary digits selected from the group consisting of: 3 binary digits, 4 binary digits, 8 binary digits, 16 binary digits, 32 binary digits, 64 binary digits, 128 binary digits, 256 binary digits, 512 binary digits, and 1024 binary digits.

5. The method of transmitting data of claim 1, wherein the ultra-wideband pulse comprises an impulse radio signal.

6. The method of transmitting data of claim 1, wherein the ultra-wideband pulse comprises a burst of electromagnetic energy having a duration that ranges between about 0.1 nanoseconds to about 100 nanoseconds.

7. The method of transmitting data of claim 1, wherein the ultra-wideband pulse comprises a burst of electromagnetic energy having a duration that can range between about 0.1 nanoseconds to about 100 nanoseconds and a power that ranges between about +30 power decibels to about −90 power decibels, as measured at a single frequency.

8. The method of transmitting data of claim 1, wherein the wire medium is selected from a group consisting of: an optical fiber ribbon, a fiber optic cable, a single mode fiber optic cable, a multi-mode fiber optic cable, a twisted pair wire, an unshielded twisted pair wire, a plenum wire, a PVC wire, a coaxial cable, and an electrically conductive material.

9. The method of transmitting data of claim 1, wherein the wire medium is part of a wire network that is selected from a group consisting of: a power line, an optical network, a cable television network, a community antenna television network, a community access television network, a hybrid fiber coax system network, a public switched telephone network, a wide area network, a local area network, a metropolitan area network, a TCP/IP network, a dial-up network, a switched network, a dedicated network, a non-switched network, a public network and a private network.

10. The method of transmitting data of claim 1, wherein the ultra-wideband pulse is used to transmit data selected from a group consisting of: telephony data, high-speed data, digital video data, digital television data, Internet communication data and audio data.

11. A method of transmitting data through a wire medium, comprising the steps of:
    means for providing the wire medium;
    means for generating an ultra-wideband pulse, the ultra-wideband pulse including a first section representing a first data symbol, and a second section representing a second data symbol.

12. A method of transmitting data through a wire medium, comprising the steps of:
    providing the wire medium; and
    generating an ultra-wideband pulse, the ultra-wideband pulse comprising a plurality of time bins, with each time bin comprising a data symbol.

13. The method of transmitting data of claim 12, wherein the data symbol represents a multiplicity of binary digits.

14. The method of transmitting data of claim 12, wherein the data symbol represents a group of binary digits selected from the group consisting of: 3 binary digits, 4 binary digits, 8 binary digits, 16 binary digits, 32 binary digits, 64 binary digits, 128 digits, 256 binary digits, 512 binary digits, and 1024 binary digits.

15. The method of transmitting data of claim 12, wherein a number of time bins may range between 3 time bins and 1024 time bins.

16. The method of transmitting data of claim 12, wherein the ultra-wideband pulse comprises an impulse radio signal.

17. The method of transmitting data of claim 12, wherein the ultra-wideband pulse comprises a burst of electromagnetic energy having a duration that ranges between about 0.1 nanoseconds to about 100 nanoseconds.

18. The method of transmitting data of claim 12, wherein the ultra-wideband pulse comprises a burst of electromagnetic energy having a duration that ranges between about 0.1 nanoseconds to about 100 nanoseconds and a power that ranges between about +30 power decibels to about −90 power decibels, as measured at a single frequency.

19. The method of transmitting data of claim 12, wherein the wire medium is selected from a group consisting of: an optical fiber ribbon, a fiber optic cable, a single mode fiber optic cable, a multi-mode fiber optic cable, a twisted pair wire, an unshielded twisted pair wire, a plenum wire, a PVC wire, a coaxial cable, and an electrically conductive material.

20. The method of transmitting data of claim 12, wherein the wire medium is part of a wire network that is selected from a group consisting of: a power line, an optical network, a cable television network, a community antenna television network, a community access television network, a hybrid fiber coax system network, a public switched telephone network, a wide area network, a local area network, a metropolitan area network, a TCP/IP network, a dial-up network, a switched network, a dedicated network, a non-switched network, a public network and a private network.

21. The method of transmitting data of claim 12, wherein the ultra-wideband pulse is used to transmit data selected from a group consisting of: telephony data, high-speed data, digital video data, digital television data, Internet communication data and audio data.

22. A method of transmitting data through a wire medium, comprising the steps of:

provi​ding the wire medium;

generating an ultra-wideband pulse, the ultra-wideband pulse comprising:
    an amplitude that represents a first data symbol; and
    a plurality of time bins, with each time bin representing a second data symbol.

23. The method of transmitting data of claim 22, wherein the first and second data symbols each represent a multiplicity of binary digits.

24. The method of transmitting data of claim 22, wherein the first and second data symbols each represent a group of binary digits selected from the group consisting of: 3 binary digits, 4 binary digits, 8 binary digits, 16 binary digits, 32 binary digits, 64 binary digits, 128 binary digits, 256 binary digits, 512 binary digits, and 1024 binary digits.

25. The method of transmitting data of claim 22, wherein a number of time bins ranges between 3 time bins and 1024 time bins.

26. The method of transmitting data of claim 22, wherein a number of amplitudes ranges between 3 amplitudes and 1024 amplitudes, with each amplitude representing a discrete data symbol.

27. The method of transmitting data of claim 22, wherein the ultra-wideband pulse comprises an impulse radio signal.

28. The method of transmitting data of claim 22, wherein the ultra-wideband pulse comprises a burst of electromagnetic energy having a duration that ranges between about 0.1 nanoseconds to about 100 nanoseconds.

29. The method of transmitting data of claim 22, wherein the ultra-wideband pulse comprises a burst of electromagnetic energy having a duration that ranges between about 0.1 nanoseconds to about 100 nanoseconds and a power that ranges between about +30 power decibels to about −90 power decibels, as measured at a single frequency.

30. The method of transmitting data of claim 22, wherein the wire medium is selected from a group consisting of: an optical fiber ribbon, a fiber optic cable, a single mode fiber optic cable, a multi-mode fiber optic cable, a twisted pair wire, an unshielded twisted pair wire, a plenum wire, a PVC wire, a coaxial cable, and an electrically conductive material.

31. The method of transmitting data of claim 22, wherein the wire medium is part of a wire network that is selected from a group consisting of: a power line, an optical network, a cable television network, a community antenna television network, a community access television network, a hybrid fiber coax system network, a public switched telephone network, a wide area network, a local area network, a metropolitan area network, a TCP/IP network, a dial-up network, a switched network, a dedicated network, a non-switched network, a public network and a private network.

32. The method of transmitting data of claim 22, wherein the ultra-wideband pulse is used to transmit data selected from a group consisting of: telephony data, high-speed data, digital video data, digital television data, Internet communication data and audio data.

* * * * *